United States Patent [19]

Miyakawa et al.

[11] Patent Number: 4,875,939
[45] Date of Patent: Oct. 24, 1989

[54] PRECOMBUSTION CHAMBER CONSTRUCTION FOR AN INTERNAL COMBUSTION ENGINE

[75] Inventors: Yasuhiro Miyakawa; Minoru Machida, both of Nagoya, Japan

[73] Assignee: NGK Insulators, Ltd., Nagoya, Japan

[21] Appl. No.: 241,899

[22] Filed: Sep. 8, 1988

[30] Foreign Application Priority Data

Sep. 14, 1987 [JP] Japan .............. 62-139324[U]

[51] Int. Cl.$^4$ .............................................. F02B 19/16
[52] U.S. Cl. ....................................... 123/271; 123/254
[58] Field of Search ................ 123/254, 270, 271, 273

[56] References Cited

U.S. PATENT DOCUMENTS

| | | | |
|---|---|---|---|
| 3,398,726 | 8/1968 | Bricoot | 123/254 |
| 4,126,106 | 11/1978 | Witzky | 123/270 X |
| 4,616,611 | 10/1986 | Ogawa et al. | 123/270 |
| 4,699,102 | 10/1987 | Taniguchi | 123/270 X |

FOREIGN PATENT DOCUMENTS

| | | | |
|---|---|---|---|
| 2587758 | 3/1987 | France | |
| 200012 | 11/1984 | Japan | 123/270 |

Primary Examiner—Tony M. Argenbright
Attorney, Agent, or Firm—Arnold, White & Durkee

[57] ABSTRACT

A ceramic precombustion chamber construction for an internal combustion engine including a precombustion chamber formed by a ceramic body to be inserted in a precombustion chamber receiving cavity of a metal cylinder head. Projections are formed on an outer circumferential surface of a metal sleeve fitted on the ceramic body, or on an inner circumferential surface of the precombustion chamber receiving cavity of a metal cylinder head, or on an outer circumferential surface of the ceramic body. Thermal insulating spaces are formed by the projections and the inner circumferential surface of the precombustion chamber receiving cavity or the outer circumferential surface of the metal sleeve or the outer circumferential surface of the ceramic body. One of the projections is formed with a glow-plug receiving aperture which communicates with a glow-plug receiving aperture formed in the precombustion chamber receiving cavity of the metal cylinder head. As a result, leakage of burnt gases is prevented to ensure a complete thermal insulating effect.

4 Claims, 6 Drawing Sheets

FIG_1
PRIOR ART

FIG_2

FIG_3

FIG_4

FIG_5

FIG_6

FIG_7

FIG_8

FIG_9a

FIG_9b

PRECOMBUSTION CHAMBER CONSTRUCTION FOR AN INTERNAL COMBUSTION ENGINE

BACKGROUND OF THE INVENTION

This invention relates to a precombustion chamber construction for a diesel engine, and more particularly a construction having thermal insulating or adiabatic spaces about a ceramic precombustion chamber for a diesel engine.

Figure 1:
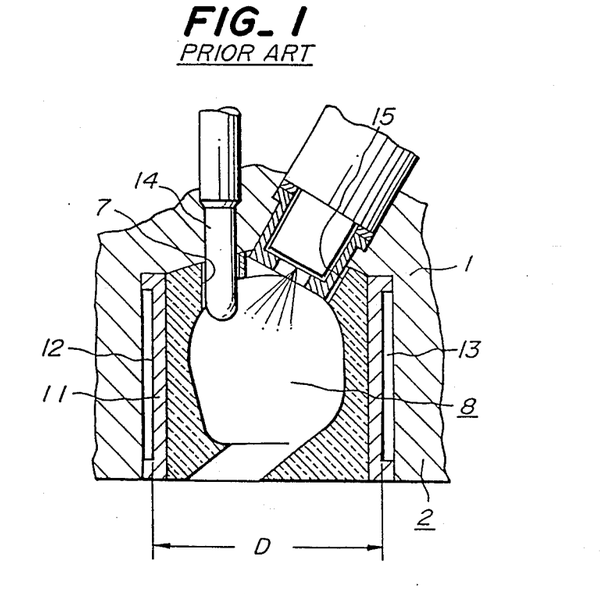
FIG. 1 is a sectional view of a precombustion chamber for an internal combustion engine of the prior art.

Ceramic precombustion chambers for diesel engines have been practically used because of their superiority in heat resistance and thermal insulation. Such ceramic precombustion chambers have been disclosed in Japanese Utility Model Application Laid-open Nos. 58-27,526, 58-175,118, and 59-21,024. Referring to FIG. 1, in conventional precombustion chambers, the ceramic precombustion chamber 1 comprises a thermal insulating space 13 provided between an outer circumference of the ceramic precombustion chamber 8 and an inner circumference of a metal cylinder head 2, and a glow-plug receiving aperture 7 in an upper portion of the chamber 8 for fitting a glow-plug 14.

In such a precombustion chamber for an internal combustion engine, the glow-plug is often provided on a side of a side wall of the ceramic precombustion chamber by reason of design. In this case, however, there is a clearance 7 between the glow-plug and the glow plug receiving aperture, through which burned gases leak into the thermal insulating space to lower the thermal insulating effect. Moreover, actual compression ratios of the engine are changed to interfere with normal engine performance.

SUMMARY OF THE INVENTION

It is a primary object of the invention to provide a precombustion chamber for an internal combustion engine, which eliminates all the disadvantages of the prior art and comprises thermal insulating spaces for reliably insulating heat in the precombustion chamber with a simple construction even if a glow-plug is provided in a side wall of the precombustion chamber.

In order to achieve the object of the invention, a ceramic precombustion chamber construction for an internal combustion engine comprises a precombustion chamber constructed by a ceramic body to be inserted in a precombustion chamber receiving cavity of a metal cylinder head. The ceramic body has a glow-plug receiving aperture, and a metal sleeve fitted on an outer circumference thereof. The metal sleeve has a plurality of projections on an outer circumferential surface thereof wherein one of the projections is formed with a glow-plug receiving aperture which communicates with a glow-plug receiving aperture formed in the ceramic body. The precombustion chamber receiving cavity of the metal cylinder head communicates with glow-plug receiving apertures provided in the metal cylinder head, metal sleeve and ceramic body. An inner circumferential surface of the precombustion chamber receiving cavity of the metal cylinder head forms thermal insulating spaces with the projections provided on the outer circumferential surface of the metal sleeve.

In a second aspect of the invention, a ceramic precombustion chamber construction for an internal combustion engine comprises a precombustion chamber constructed by a ceramic body to be inserted in a precombustion chamber receiving cavity of a metal cylinder head. The ceramic body has a glow-plug receiving aperture, and a metal sleeve fitted on an outer circumference thereof. The metal cylinder head is formed with a plurality of projections on an inner circumferential surface of the precombustion chamber receiving cavity, wherein one of the projections is formed with a glow-plug receiving aperture which communicates witha glow-plug receiving aperture formed in the metal cylinder. The precombustion chamber receiving cavity of the metal cylinder head communicates with glow-plug receiving apertures provided in the metal cylinder head, metal sleeve and ceramic body. An outer circumferential surface of the metal sleeve forms thermal insulating spaces with the projections provided on the inner circumferential surface of the precombustion chamber receiving cavity of the metal cylinder head.

In a third aspect of the invention, a ceramic precombustion chamber construction for an internal combustion engine comprises a precombustion chamber constructed by a ceramic body to be inserted in a precombustion chamber receiving cavity of a metal cylinder head. The ceramic body has a glow-plug receiving aperture, and is formed wtih a plurality of thereof projections on an outer circumference of wherein one of the projections is formed with a glow-plug receiving aperture. The precombustion chamber receiving cavity of the metal cylinder head communicates with a glow-plug receiving aperture provided in the metal cylinder head. An inner circumferential surface of the precombustion chamber receiving cavity of the metal cylinder head forms thermal insulating spaces with the projections provided on the outer circumference of said ceramic body.

In a fourth aspect of the invention, a ceramic precombustion chamber construction for an internal combustion engine comprises a precombustion chamber constructed by a ceramic body to be inserted in a precombustion chamber receiving cavity of a metal cylinder head. The ceramic body has a glow-plug receiving aperture and the metal cylinder head has a plurality of projections on an inner circumferential surface of the precombustion chamber receiving cavity, wherein one of the projections is formed with a glow-plug receiving aperture which communicates with a glow-plug receiving aperture provided in the metal cylinder head. The precombustion chamber receiving cavity of the metal cylinder head communicates with the glow-plug receiving aperture provided in the metal cylinder head, and an outer circumferential surface of the ceramic body forms thermal insulating spaces with the projections provided on the inner circumferential surface of said precombustion chamber receiving cavity of the metal cylinder head.

According to the invention, the thermal insulating spaces are formed by the outer circumferential surface of the ceramic precombustion chamber, the inner circumferential surface of the metal cylinder head and projections, and one of the projections is formed with the glow-plug receiving aperture communicating with the glow-plug receiving aperture of the ceramic precombustion chamber. Therefore, leakage of burnt gases is prevented to ensure the thermal insulation under the condition of the glowplug being provided. Moreover, the above object can be accomplished a simple change of design of cylinder heads or ceramic precombustion chambers of the prior art without lowering engine performance.

In order that the invention may be more clearly understood, preferred embodiments will be described, by way of example, with reference to the accompanying drawings.

DESCRIPTION OF THE PREFERRED EMBODIMENTS

Figure 2:
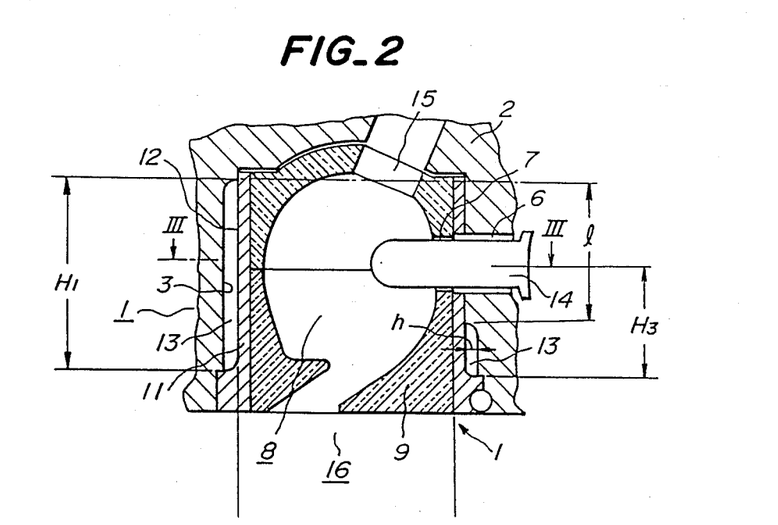
FIG. 2 is a sectional view illustrating one embodiment of a precombustion chamber for an internal combustion engine according to the invention.
Figure 3:
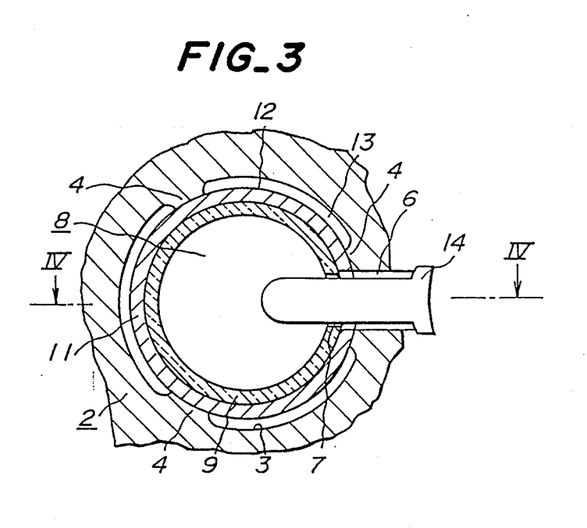
FIG. 3 is a sectional view taken along a line III—III in FIG. 2.

Referring to FIG. 2, a precombustion chamber 1 for an internal combustion engine according to the invention comprises a ceramic precombustion chamber 8 received in a metal cylinder head 2. The metal cylinder head 2 is provided with projections 4 so as to divide an inner circumference of the cylinder head into three equal portions as shown in FIG. 3 which is a sectional view of the chamber taken along a line III—III in FIG. 2. These projections are jointed to a metal sleeve 11 which is fitted on a ceramic precombustion chamber member 9 of the chamber 8 by means of thermal shrinkage fit.

Figure 4:
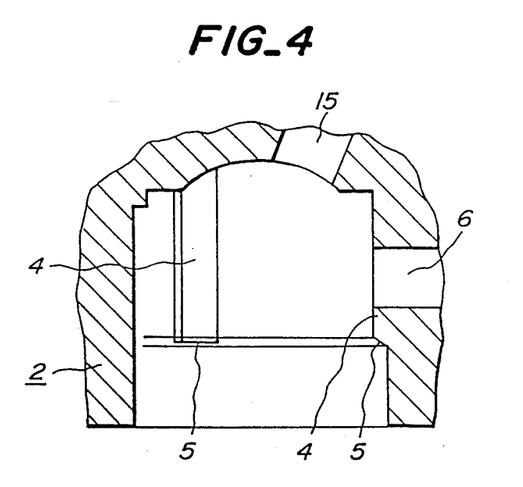
FIG. 4 is a sectional view taken along a line IV—IV in FIG. 3.

As shown in FIG. 4, each of the projections 4 formed on the inner circumference 3 of the metal cylinder head 2 extends from a lower portion below glow-plug receiving apertures 6 and 7 formed in the metal cylinder head 2 and the ceramic precombustion chamber member 9 to an upper portion above the apertures 6 and 7 or toward a fuel injection nozzle receiving aperture 15. Tip ends 5 of the projections 4 are at the same level from a bottom surface of the metal cylinder head 2 in consideration of working the metal cylinder head 2 and press-fitting the metal sleeve 11 of the ceramic precombustion chamber 8. The tip ends 5 of the projections 4 are equally spaced from a center axis of the ceramic precombustion chamber 8. The tip ends 5 are chamfered on a side of a main fuel combustion chamber 16 (FIG. 2).

The number position and shapes of the projections 4 are determined according to a position of the glow-plug 14 and specification of the engine. However, areas of the projections 4 in contact with the outer circumferential surface 12 of the ceramic precombustion chamber 8 are preferably as small as possible, more preferably less than 15% of the total area of the outer circumferential surface 12 of the chamber 8 in view of the thermal insulating effect, so long as the projections 4 keep their strengths to support the chamber 8.

The number of the projections 4 is not limited to three as in the embodiment shown in FIG. 3. However, too many projections 4 increase thermal transmission and reduce the thermal insulating space, which results in less of a thermal insulating effect, although the jointing strength between the metal cylinder head 2 and the ceramic precombustion chamber 8 is increased. On the other hand, too few projections 4 makes it difficult to position the ceramic precombustion chamber 8 and the metal cylinder head 2 in a predetermined relation. Therefore, the number of the projections is preferably 2-4.

Moreover, with particular shapes of the projections, they may be formed on either of the inner circumferential surface 3 of the metal cylinder head and the outer circumferential surface 12 of the ceramic precombustion chamber including the glow-plug receiving apertures 6 and 7.

In case that a metal sleeve 11 made of a heat-resistant steel is press-fitted in an aluminum cylinder head 2, interference for the press-fitting may be determined by temperature distributions in the precombustion chamber under engine operating conditions from idling to full road. It is less than 100 um, preferably less than 60 μm.

The thermal insulating spaces 13 are formed by the inner circumferential surface 3 of the metal cylinder head 2, projections 4 and the outer circumferential surfaces of the metal sleeve 11.

The metal cylinder head 2 and the ceramic precombustion chamber 8 are formed with the glow-plug receiving apertures 6 and 7 in the side walls and the fuel injection nozzle receiving apertures 15 in the upper walls.

The glow-plug receiving aperture 6 of the metal cylinder head 2 is formed in one of the projections 4 and communicates with the glow-plug receiving aperture 7 of the ceramic precombustion chamber 8.

A width of the projection 4 formed with the glow-plug receiving aperture 6 is 2 mm or more, preferably 4 mm or more wider than the diameter of the glow-plug receiving aperture 6 in order to seal the metal sleeve 11 with the projection 4 in an air-tight manner.

Figure 5:
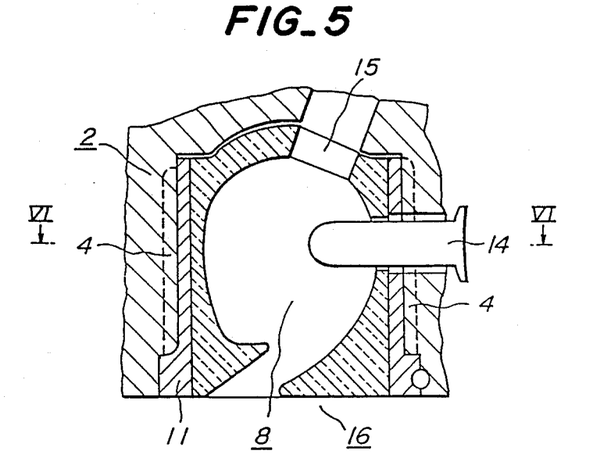
FIG. 5 is a sectional view illustrating another embodiment of a precombustion chamber according to the invention.
Figure 6:
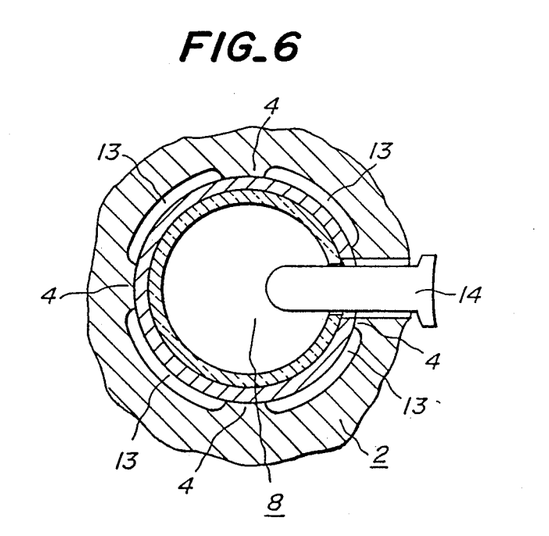
FIG. 6 is a cross-sectional view of the metal cylinder head and the ceramic precombustion chamber taken along a line VI—VI in FIG. 5.

FIGS. 5 and 6 illustrate another embodiment of the precombustion chamber construction for an internal combustion engine according to the invention which is different in projections from the embodiment shown in FIG. 2.

In This embodiment, projections 4 are formed at four locations on an inner circumference of a metal cylinder head 2. The projections 4 extend from an upper surface of a lower flange of a ceramic precombustion chamber 8 to the proximity of a fuel injection nozzle receiving aperture 15 in an upper portion of the ceramic precombustion chamber 8.

Figure 7:
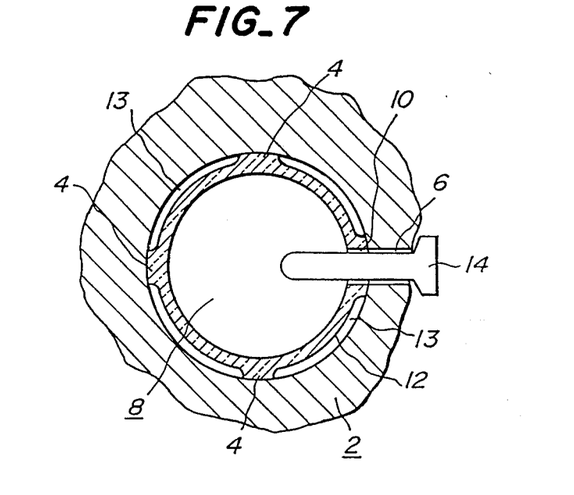
FIG. 7 is a cross-sectional view of a further embodiment of a precombustion chamber according to the invention.

FIG. 7 illustrates a further embodiment of the precombustion chamber construction which is different in projections and ceramic precombustion chamber 8 from the first embodiment shown in FIG. 2.

In this embodiment, projections 4 are formed integrally with an outer circumferential surface 12 of a ceramic precombustion chamber 8. A glow-plug receiving aperture 10 formed in one projection 4 communicates with a glow-plug receiving aperture 7 formed in a metal cylinder head 2. The projections 4 are directly jointed to the outer circumferential surface 12 of the ceramic precombustion chamber 8 without interposing the metal sleeve 11 in FIG. 2.

The invention is not limited to the embodiments above described. For example, the ceramic precombustion chamber 8 may be formed by upper and lower precombustion chambers as disclosed in the Japanese Utility Model Application Laid-open No. 58-27,526, or may be integrally formed as disclosed in the Japanese Utility Model Application Laid-open No. 59-21,024.

EXAMPLE 1

In order to ascertain the thermal insulating effect of the present invention, precombustion chambers were made, each of which comprises a metal sleeve made of a heat-resistant steel fitted on a ceramic precombustion chamber member bymeans of thermal shrinkage fit.

Figure 8:
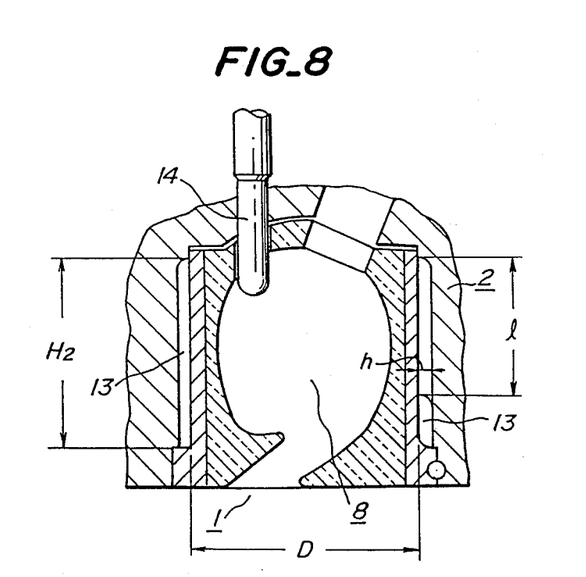
FIG. 8 is a sectional view of the precombustion chamber for an internal combustion engine used in the Examples.

These precombustion chambers were press-fitted into aluminum alloy cylinder heads to form precombustion chamber constructions shown in FIG. 8. In this case, the aluminum alloy cylinder heads were divided into two groups. Each of the cylinder heads of one group was formed with two to four projections having a length (l) of 20 mm, a height (h) of 3 mm and a width (w) of 4-12 mm. On the other hand, each of the cylinder heads of the other group was not formed with any projections.

The thermal insulating efect was determined by measuring temperatures at tip ends of glow-plugs when a diesel engine with these precombustion chamber constructions was operated at an average effective net pressure of 4 Bar at 2,400 rpm. The higher the temperature at the tip end of the glow-plug, the more effective is the thermal insulation from the heating of the precombustion chamber. The thermal insulating effect of the precombustion chamber reconstructions provided with the projections was reviewed on the basis of temperatures of glow-plugs in ceramic precombustion chambers with and without thermal insulating spaces.

Table 1 shows results of the test and shapes and principal dimensions of the precombustion chamber constructions.

TABLE 1

| Shape of precombustion chamber construction (FIG. 8) | | Shape and number of projections | | | | Rate of contacting area of projections to surface area of insulating space (%) | Temperature at tip end of glow-plug (°C.) | Thermal insulating effect (Note) (%) |
|---|---|---|---|---|---|---|---|---|
| $H_2$ (mm) | D (mm) | Length (l) (mm) | Width (w) (mm) | Height (h) (mm) | Number | | | |
| 1 | | | | | 2 | 4.8 | 665 | 88.9 |
| 2 | | 20 | 4 | 3 | 3 | 7.3 | 650 | 77.8 |
| 3 | | | | | 4 | 9.7 | 645 | 74.1 |
| 4 | | | | | 2 | 7.3 | 650 | 77.8 |
| 5 | 31.2 | 34 | 20 | 6 | 3 | 3 | 10.9 | 640 | 70.4 |
| 6 | | | | | 4 | 14.5 | 635 | 66.7 |
| 7 | | | | | 2 | 9.7 | 645 | 74.1 |
| 8 | | 20 | 8 | 3 | 3 | 14.5 | 635 | 66.7 |
| 9 | | | | | 4 | 19.4 | 620 | 55.6 |
| 10 | | | | | 2 | 14.5 | 635 | 66.7 |
| 11 | | 20 | 12 | 3 | 3 | 21.8 | 615 | 51.9 |
| 12 | 31.2 | 34 | | | 4 | 29.1 | 605 | 44.4 |
| 13 | | Without projections | | | | 0 | 680 | 100 |
| 14 | | Metal cylinder in close contact with metal sleeve without projections | | | | 100 | 545 | — |

(Note)
Thermal insulating effect = $\frac{\text{(Temperature of each glow-plug)} - \text{(Temperature of No. 14 glow-plug)}}{\text{(Temperature of No. 13 glow-plug)} - \text{(Temperature of No. 14 glow-plug)}} \times 100$ As can be seen from the results in Table 1, the precombustion chamber construction provided with the projections according to the present invention is superior in the thermal insulating effect. In case that the rate of the contacting area of the projections to the surface area of the insulating space is less than 15%, particularly, the temperature of the glow-plug is higher than 630° C. so that occurrence of soot in burnt gases is effectively prevented.

EXAMPLE 2

Figure 9A:
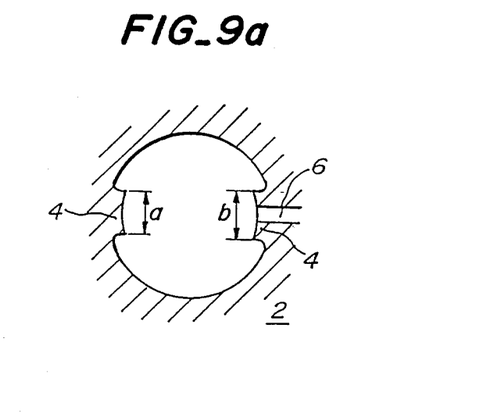
FIGS. 9a and 9b are cross-sectional views of principal parts of metal cylinder heads used in the Examples.
Figure 9B:
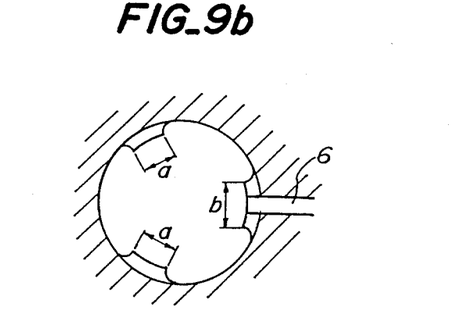

With the precombustion chamber construction according to the present invention shown in FIG. 2, that is, provided with the glow-plug in the side wall of the ceramic precombustion chamber, the thermal insulating effect was examined by measuring the temperature at tip ends of glow-plugs. Testing conditions were substantially the same as those in Example 1 with exception of the position of the glow-plug and arrangement and shape of the projections as shown in FIGS. 9a and 9b. The conditions and results are shown in Table 2.

TABLE 2

| Shape of precombustion chamber construction | Shape and number of projections | | | | | | Rate of contacting area of projections to surface area of insulating space (%) | Temperature at tip end of glow-plug (°C.) |
|---|---|---|---|---|---|---|---|---|
| | Shape | Length (l) # (mm) | Width (mm) (a) | (b) | Height (h) (mm) | Number | | |
| 1 | | FIG. 9a | 16.5 | 10 | 12 | 3 | 2 | 10.4 | 660 |
| 2 | F1* | FIG. 9b | 16.5 | 10 | 12 | 3 | 3 | 15.8 | 655 |
| 3 | | FIG. 9b | 27.5 | 10 | 12 | 3 | 3 | 27.4 | 630 |

TABLE 2-continued

| Shape of precombustion chamber construction | Shape and number of projections | | | | | Rate of contacting area of projections to surface area of insulating space (%) | Temperature at tip end of glow-plug (°C.) |
|---|---|---|---|---|---|---|---|
| | Shape | Length (l) # (mm) (a) | Width (mm) (b) | Height (h) (mm) | Number | | |
| 4 | F2** | — | — | — | — | 0 | 100 | 570 |

(Note)
F1*: Shape is that corresponding to 27.5 mm height (H₁) of the thermal insulating space, 35 mm outer diameter (D) of the precombustion chamber and 17 mm position (H) of the glow-plug in FIG. 2.
F2**: Shape is that shown in FIG. 2 after removal of the thermal insulating space.
: Concerning the length (l), please refer to FIG. 2.

From the results in the above examples, the precombustion chamber for the internal combustion engine according to the invention is particularly superior in the thermal insulating effect in comparison with those of the prior art. Particularly, contacting area of the projections with the ceramic precombustion chamber is preferably less than 15% of the total area of outer circumference of the ceramic precombustion chamber for preventing soot in burnt gases.

Figure 10:
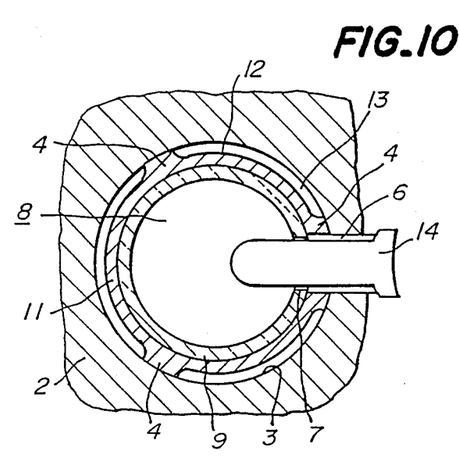
FIG. 10 is a sectional view of another embodiment of the ceramic precombustion chamber construction having a metal sleeve formed on its outside with projections.
Figure 11:
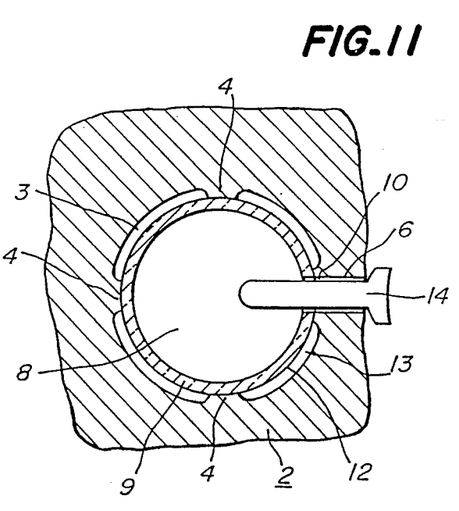
FIG. 11 is a sectional view of a further embodiment of the precombustion chamber construction whose a ceramic precombustion chamber member fitted on projections formed in an inside of a metal cylinder head.

Moreover, the inventors ascertained the same effects with ceramic precombustion chamber constructions wherein a metal sleeve fitted on a ceramic precombustion chamber member 9 is formed on an outside with projections 4 adapted to be in contact with an inner circumference 3 of a metal cylinder head 2 (FIG. 10) and a ceramic precombustion chamber member 9 is directly fitted on projections 4 formed on an inner circumference of a metal cylinder head 2 without using a metal sleeve (FIG. 11).

As can be seen from the above explanation, according to the invention the thermal insulating spaces are formed by the outer circumferential surface of the ceramic precombustion chamber, the inner circumferential surface of the metal cylinder head and the projections and the glow-plug receiving aperture is provided in one of the projections so as to communicate with the glow-plug receiving aperture of the ceramic precombustion chamber. Therefore, with a glow-plug being inserted in the apertures, leakage of burnt gases is prevented to ensure the complete thermal insulating effect. According to the invention, the above effect can be accomplished by a simple change of design of the prior art cylinder head or ceramic precombustion chamber without lowering engine performance.

It is further understood by those skilled in the art that the foregoing description is that of preferred embodiments of the disclosed constructions and that various changes and modifications may be made in the invention without departing from the spirit and scope thereof.

What is claimed is:

1. A ceramic precombustion chamber construction for an internal combustion engine, comprising:
a precombustion chamber formed by a ceramic body to be inserted into a precombustion chamber receiving cavity of a metal cylinder head, said ceramic body having a glow-plug receiving aperture; and
a metal sleeve fitted on an outer circumference of said ceramic body and having a plurality of projections on an outer circumferential surface thereof, one of said projections being formed with a glow-plug receiving aperture which communicates with a glow-plug receiving aperture formed in said ceramic body;
wherein said precombustion chamber receiving cavity of said metal cylinder head communicates with glow-plug receiving apertures provided in said metal cylinder head, metal sleeve and ceramic body, and an inner circumferential surface of said precombustion chamber receiving cavity of said metal cylinder head forms thermal insulating spaces with said projections provided on the outer circumferential surface of said metal sleeve.

2. A ceramic precombustion chamber construction for an internal combustion engine comprising:
a precombustion chamber formed by a ceramic body to be inserted into a precombustion chamber receiving cavity of a metal cylinder head, said ceramic body having a glow-plug receiving aperture; and
a metal sleeve fitted on an outer circumference of said ceramic body;
said metal cylinder head being formed with a plurality of projections on an inner circumferential surface of said precombustion chamber receiving cavity, one of said projections being formed with a glow-plug receiving aperture which communicates with a glow-plug receiving aperture formed in said metal cylinder head;
wherein said precombustion chamber receiving cavity of said metal cylinder head communicates with glowplug receiving apertures provided in said metal cylinder head, metal sleeve and ceramic body, and an outer circumferential surface of said metal sleeve forms thermal insulating spaces with said projections provided on the inner circumferential surface of said precombustion chamber receiving cavity of the metal cylinder head.

3. A ceramic precombustion chamber construction for an internal combustion engine, comprising:
a precombustion chamber formed by a ceramic body to be inserted into a precombustion chamber receiving cavity of a metal cylinder head, said ceramic body having a glow-plug receiving aperture and a plurality of projections formed on an outer radial circumference thereof, one of said projections being formed wtih said glow-plug receiving aperture formed therethrough;
wherein said precombustion chamber receiving cavity of said metal cylinder head communicates with a glow-plug receiving aperture provided in said metal cylinder head, an inner circumferential surface of said precombustion chamber receiving cavity of said metal cylinder head forms thermal insulating spaces with said projections provided on the outer radial circumference of said ceramic body, and an interior of the glow-plug receiving aperture is isolated from communication with the thermal insulating spaces.

4. A ceramic precombustion chamber construction for an internal combustion engine, comprising:

a precombustion chamber formed by a ceramic body to be inserted into a precombustion chamber receiving cavity of a metal cylinder head, said ceramic body having a glow-plug receiving aperture, said metal cylinder head being formed with a plurality of projections on an inner circumferential surface of said precombustion chamber receiving cavity, one of said projections being formed with a glow-plug receiving aperture which communicates with a glow-plug receiving aperture provided in said metal cylinder head;

wherein said precombustion chamber receiving cavity of said metal cylinder head communicates with the glow-plug receiving aperture provided in said metal cylinder head, and an outer circumferential surface of said ceramic body forms thermal insulating spaces with said projections provided on the inner circumferential surface of said precombustion chamber receiving cavity of the metal cylinder head.

* * * * *